310-12 SR
FIP8502 OR 4,358,691

United States Patent [19]

Naylor

[11] 4,358,691

[45] Nov. 9, 1982

[54] LINEAR ELECTRIC MOTOR

[75] Inventor: Robert W. Naylor, Weston, Canada

[73] Assignee: CTS Corporation, Elkhart, Ind.

[21] Appl. No.: 64,388

[22] Filed: Aug. 8, 1979

[30] Foreign Application Priority Data

Mar. 13, 1979 [CA] Canada ........................ 323331

[51] Int. Cl.³ .................................... H02K 41/00

[52] U.S. Cl. ................................ 310/12; 310/14; 335/234

[58] Field of Search .................... 310/15, 30, 14, 241, 310/34, 14 35, 12; 335/229, 230, 234

[56] References Cited

U.S. PATENT DOCUMENTS

| | | | |
|---|---|---|---|
| 2,449,439 | 9/1948 | Wittlinger | 337/121 |
| 3,024,374 | 3/1962 | Stauder | 310/30 X |
| 3,103,603 | 9/1963 | Reutter | 310/30 |
| 3,433,983 | 3/1969 | Keistman et al. | 310/30 X |
| 3,484,629 | 12/1969 | Kunz | 310/30 X |
| 3,495,147 | 2/1970 | Flora | 310/14 X |
| 3,688,495 | 9/1972 | Fehler et al. | 60/39.28 |
| 4,046,118 | 9/1977 | Aono | 123/119 EC |
| 4,071,042 | 1/1978 | Lombard et al. | 137/332 |
| 4,105,726 | 8/1978 | Lindberg | 261/121 B |
| 4,129,105 | 12/1979 | Ito et al. | 123/119 EC |
| 4,132,199 | 1/1979 | Kuroiwa et al. | 123/119 EC |
| 4,136,645 | 1/1979 | Ito et al. | 123/32 EE |
| 4,208,358 | 6/1980 | Atkins et al. | 261/50 R |

FOREIGN PATENT DOCUMENTS

| | | | |
|---|---|---|---|
| 684220 | 7/1966 | Belgium . | |
| 1489088 | 5/1969 | Fed. Rep. of Germany . | |
| 2013051 | 10/1971 | Fed. Rep. of Germany . | |
| 2813752 | 2/1979 | Fed. Rep. of Germany . | |
| 1181923 | 9/1957 | France . | |
| 1470642 | 4/1977 | United Kingdom . | |
| 1484766 | 9/1977 | United Kingdom . | |

OTHER PUBLICATIONS

Patent Abstracts of Japan, vol. 1, No. 105, Sep. 16, 1977, p. 3071M78 and JP-A-53-70225.

Automobiletechnische Zeitschrift, vol. 80, No. 9, Sep. 1979, Stuttgart, G. Hartzel "Vergasser mit Electronischem Regeleingriff", p. 400.

*Primary Examiner*—Donovan F. Duggan

*Attorney, Agent, or Firm*—John A. Young; Larry J. Palguta

[57] ABSTRACT

A linear electric motor comprising a frame of magnetizable material, an armature provided with a permanent magnet having a pair of magnetic poles movably supported in the frame, and a stationary winding circumposing the armature, the winding comprising a pair of coils wound on a pair of axially spaced bobbins secured to the frame. The bobbins supporting the coils are disposed adjacent to the end portions of the frame. Each coil circumposes a pole piece secured to an end portion of the armature and each of the coils is disposed between one of the magnetic poles and the frame. Energization of the coils of the stationary winding exerts a force on the coils with respect to the armature resulting in linear motion of the armature.

7 Claims, 5 Drawing Figures

LINEAR ELECTRIC MOTOR

BACKGROUND ART

This invention relates to linear electric motors and, more particularly, to a linear electric motor having a stationary winding and a moveable permanent magnet armature.

Recently the governments of many countries have imposed regulations on automotive manufacturers requiring that they meet progressively more stringent emission standards for and simultaneously reduce fuel consumption of automobiles. The manufacturers have encountered great difficulty in attempting to meet these two goals in an automobile of the size and performance desired by the market. To achieve a marketable automobile complying with current government regulations, all car manufacturers have concluded that they must provide a system of electronic control of engine performance. This system comprises a plurality of sensors for detecting performance parameters, a small computer for integrating the various performance parameters and specifying the necessary adjustments to be made to the engine to improve the performance parameters, and an actuator for effecting proper adjustment to the engine. One of the critical adjustments of an automobile engine is accurately adjusting the air/fuel ratio of the mixture of an engine carburetor by controlling the position of the carburetor metering rods. An actuator of the solenoid type is currently available for controlling the position of the metering jets of a carburetor and continuously retuning the carburetor several times per second. Retuning an engine carburetor several times per second by adjusting the air/fuel ratio of the mixture with a solenoid-type actuator has enabled automotive manufacturers to meet the current emission standards for and reduce fuel consumption of automobiles. It is, however, questionable whether the solenoid-type actuator can be employed for further effecting a decrease in engine emissions and/or decreasing fuel consumption, i.e., increasing engine efficiency. Accordingly, it would be desirable to provide an improved actuator for a carburetor of an automobile engine.

With current emphasis on gasoline conservation, national policy favors lowering of automobile fuel consumption. Improved metering of gasoline or fuel supplied by the carburetor of an automobile engine improves the air/fuel mixture and reduces unneeded burning of gasoline. To achieve the fastest response in any given system for a given force, acceleration of the moving member is maximized by having the mass of the moving member minimized. The solenoid-type actuator currently employed in an engine carburetor comprises a plunger of magnetizable material positioned within and circumposed by a stationary winding of current-carrying wire. When the stationary winding is energized, a magnetic field is produced and exerts a force on the plunger, thereby causing axial acceleration of the plunger relative to the stationary winding in the direction of the coil winding. However, due to inductance in the stationary winding, maximum acceleration response of the plunger is not attained. As current increases in the stationary winding, a change in the magnetic field results and produces an opposing voltage across the winding which decreases the rate of increase of the current in reaching full value. Since inductance in the electrical circuit opposes the change of current, cancellation of inductance is essential to achieve optimum acceleration for a given mass. It would, therefore, also be desirable to provide an actuator that overcomes the undesirable effect of inductance produced by the stationary winding of a solenoid.

The reluctance of the magnetic path in a solenoid-type actuator varies with the plunger position and varies the force acting on the plunger. Further, when the reluctance is a minimum and the magnetic centers coincide, the force exerted on the plunger is zero. Since force produced on a solenoid plunger is proportional to the current input to the second order, i.e., $F=kI^2$, acceleration response is non-linear. As a result it is difficult to position quickly and accurately the plunger of a solenoid-type actuator with respect to its support frame. Further, the axial direction of the force and movement of the plunger of a solenoid is always in the same direction regardless of the winding direction of the solenoid coil or the direction of the current in the coil. It would therefore be desirable to provide an actuator where the force can be exerted in either axial direction.

Accordingly, an object of the present invention is to provide a new and improved permanent magnet electric motor having a stationary winding for moving the magnet in either direction.

Another object of the present invention is to provide a linear motor having a stationary winding and a pair of pole pieces secured to a permanent magnet for directing flux through the winding and for axially supporting the magnet.

Still another object of the present invention is to provide a linear electric motor wherein inductance of the stationary winding is cancelled to maximize acceleration of the armature of the motor.

An additional object of the present invention is to provide a linear electrical motor with a combination bobbin and armature bearing member supporting a stationary winding and an armature.

Yet another object of the present invention is to provide a small linear motor employable in a carburetor chamber of an automobile engine which imposes strict limitations on reliability and mass.

Still a further object of the present invention is to provide a linear electric motor having a winding and an armature provided with a pole piece not only directing flux to the winding but also connecting the magnet to an actuator rod for controlling the metering jets of an automobile carburetor.

Further objects and advantages of the present invention will become apparent as the following description proceeds, and the features of novelty characterizing the invention will be pointed out with particularity in the claims annexed to and forming a part of this specification.

Briefly, the present invention relates to a linear electric motor comprising a frame of magnetizable material, an armature movably supported by the frame, the armature comprising a permanent magnet having a pair of magnetic poles and a pair of pole pieces of magnetizable material, the pole pieces being secured to the magnetic poles. A stationary winding is secured to the frame and circumposes the pole pieces of the armature, and a bearing member of non-magnetizable material interposed between the pole piece and the stationary winding supports the armature. In another embodiment of the invention, a pair of pole shoes is fixedly secured to the frame. For a better understanding of the present invention, reference may be had to the accompanying drawings wherein the same reference numerals have been applied to like parts and wherein:

Figure 1:
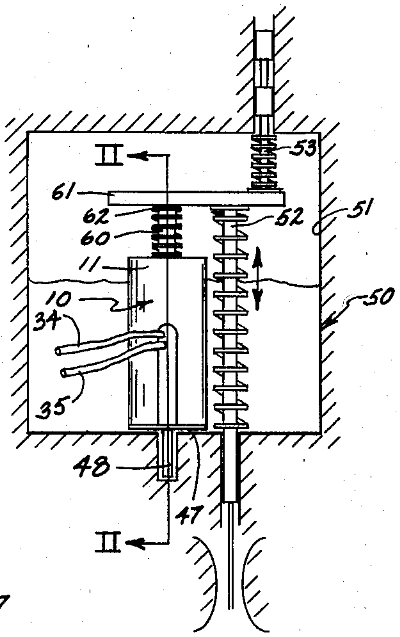
FIG. 1 is a side view of a linear electric motor mounted in a chamber of an engine carburetor.
Figure 2:
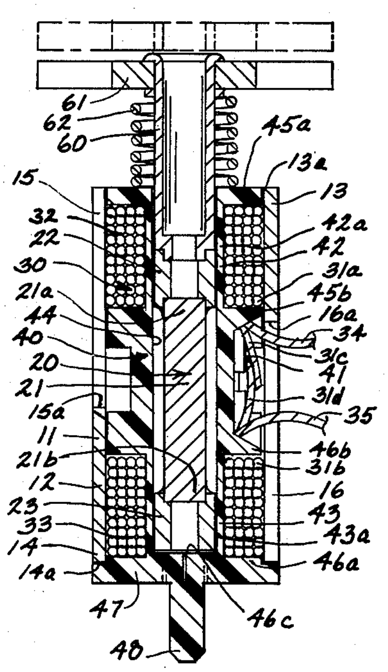
FIG. 2 is a sectional view of the linear electric motor taken along lines II-II of FIG. 1.
Figure 3:
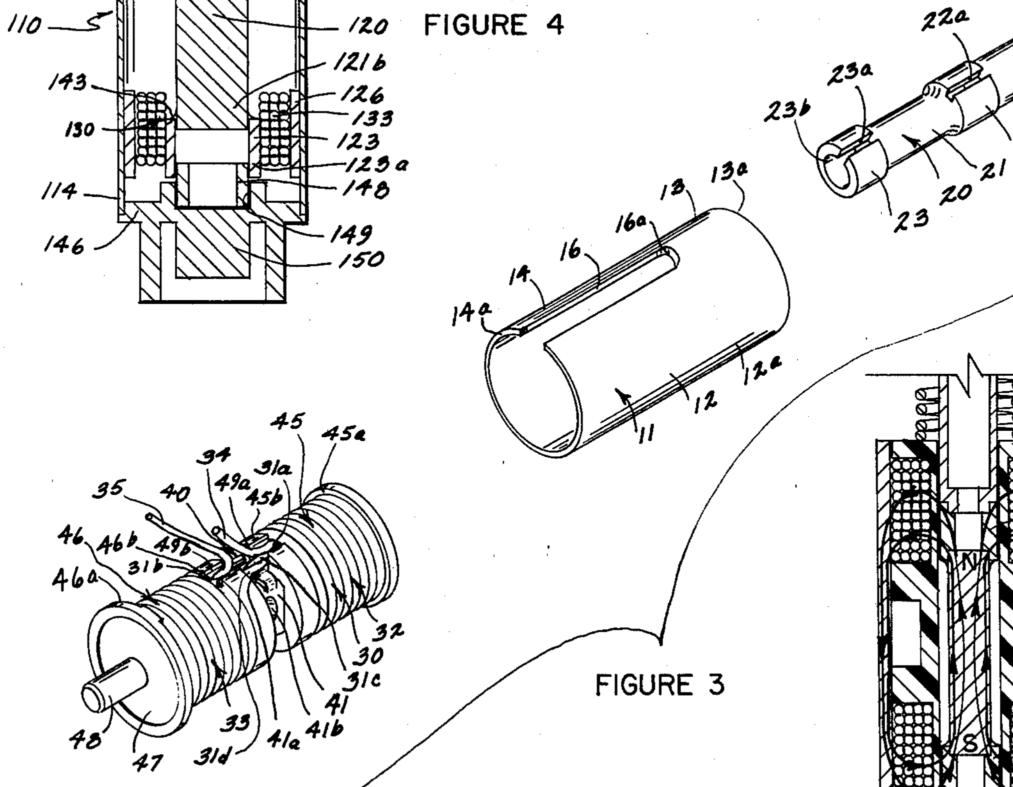
FIG. 3 is an exploded view of the linear electric motor of FIG. 1.

Referring now to FIGS. 1 through 3 of the drawings, there is illustrated an electric motor of the linear type generally indicated at 10 comprising a frame 11, an armature 20 movably supported in the stationary frame and a winding 30 in spaced relationship circumposing the armature and wound on a bobbin 40 fixedly secured to the frame.

Considering first the frame 11 as best shown in FIGS. 2 and 3 of the drawings, it comprises an elongated hollow cylinder 12 of magnetizable material generally employed in the manufacture of electric motors. The cylinder 12 is provided with a center portion 12a and end portions 13, 14. A pair of elongated notches 15, 16 is provided in the frame, each of the notches extending from the ends 13a, 14a of the cylinder 12 inwardly toward the center portion 12a of the cylinder and having bight portions 15a, 16a. The notches are 180 degrees out of phase with each other on the hollow cylinder 12. Inasmuch as the cylinder 12 is part of the magnetic circuit of the motor 10, the notches 15, 16 reduce eddy current losses and improve overall efficiency of the motor 10.

In accord with the present invention, the armature 20 (see FIGS. 2 and 3) comprises a permanent magnet 21 and a pair of pole pieces 22, 23 fixedly secured to the magnet define a pair of magnetic poles. The magnet 21 of a high flux density material, such as Alnico 5, is employed for obtaining high motor efficiency. It is to be understood that the permanent magnet 21 can also comprise a pair of individual permanent magnets fixedly secured to a magnetizable material defining the center portion of the armature. The pole pieces 22, 23 are secured to opposite ends of the permanent magnet 21 and the outer surfaces of the pole pieces are disposed closer to the frame 11 than the outer surface of the magnet 21 to constrain the flow of flux emanating from the magnet 21 through the pole pieces.

Preferably and in accord with the present invention, the permanent magnet 21 is plated with a solderable metal such as tin having a copper flash undercoat. The pole pieces 22, 23 are each provided with an opening 22b, 23b substantially the same as the diameter of the permanent magnet 21, are disposed in overlapping relationship with the end portions 21a, 21b (see FIG. 2) of the magnet 21, and are plated of the same material as the permanent magnet to facilitate soldering of the pole pieces 22, 23 to the end portions 21a, 21b with solder bodies 24. Each of the pole pieces 22, 23 is respectively provided with an elongated slot 22a, 23a to minimize eddy current losses and to provide optimum motor efficiency. When optimum motor efficiency is not essential, it is unnecessary to provide the slots 22a, 23a in the pole pieces and the notches 15, 16 in the frame.

As best shown in FIGS. 2 and 3, the stationary winding 30 is cylindrical, wound of suitable magnet wire 31, and comprises a pair of coils 32, 33 axially spaced from each other and wound on a bobbin 40 fixedly secured to the frame. Each of the coils 32, 33 respectively circumposes the pole pieces 22, 23 of the armature 20 and is disposed adjacent to the end portions 13, 14 of the frame 11. To eliminate inductance in the electrical circuit, the pair of coils 32, 33 is wound in opposite directions or in the same direction with the input current to each of the coils reversed. Preferably and in accord with the present invention, tests have determined that the mass of the stationary winding 30 should be greater than the mass of the permanent magnet 21 to maximize acceleration of the armature with a specified current in the winding 30.

The bobbin 40 supporting the winding 30 is molded of a non-magnetizable material such as nylon and is fixedly secured within and to the hollow cylinder 12. The bobbin 40 comprises a rectangular center section 41 integrally joining a pair of bobbin sections 42, 43 in axially aligned and spaced relation, the bobbin sections receiving the coils 32, 33. An axial bore 44 of uniform diameter is provided in each of the bobbin sections 42, 43 for receiving a not shown spindle during winding of the coils. Each of the bobbin sections comprises a cylindrical mmember 42a, 43a and a pair of spaced rims 45a, 45b and 46a, 46b respectively extending from the cylindrical members 42a, 43a. The rims 45b, 46b are integral with and adjacent to the rectangular center section 41. An end member 47 extending from the rim 46a and integral with the bobbin 40 abuts the end 14a of the cylinder 12 and locates the bobbin 40 relative to the cylinder. The bore 44 does not extend through the rim 46a and the center portion 46c of the rim 46a functions as a stop member and limits inward movement of the armature 20.

As best shown in FIG. 3 of the drawings, both of the coils 32, 33 are wound in the same direction having start wires 31a, 31b and end wires 31c, 31d but the end wire 31c of coil 32 is connected to the end wire 31d of coil 33, thereby eliminating or cancelling the inductance of the electrical circuit when the coils are energized by applying a voltage across start wires 31a, 31b. A pair of lead wires 34, 35 is connected respectively to the start wire 31a of the coil 32 and to the start wire 31b of the coil 33. For the purpose of protecting the ends 31a, 31b, 31c, 31d of the coils during assembly of the bobbin 40 into the cylinder 12, the ends are disposed in suitable recesses 49a, 49b provided respectively in the rims 45b, 46b, and an elongated slot 41a communicating with the recesses 49a, 49b provided in the center section 41 receives the insulated lead wires 34, 35. The lead wires 34, 35 are routed outwardly from the frame 11 through one of the notches 15, 16.

Preferably, according to the present invention and for the purpose of movably supporting the armature 20 within the frame, the bobbin 40 provided with the axial bore 44 specifically defines a bearing support for the pole pieces 22, 23 of the armature 20. The diameter of the bore 44 of the bobbin is slightly larger than the diameter of the pole pieces 22, 23 to facilitate axial movement and, when necessary, relative rotation between the armature and the frame. A radial bore 41b (see FIG. 3) communicating with the axial bore 44 provided in the center section 41 prevents pumping of fuel during movement of the armature 20. Referring now to FIG. 1 of the drawings, the linear motor 10 of the present invention finds particular application in a carburetor 50 of a gasoline engine where mass and size limitations placed on the motor 10 are critical. The motor 10 is mounted within a chamber 51 of the carburetor 50 for positioning a plurality of metering jets 52, 53 of the carburetor. A pintle 48 extends outwardly from the center of the end member 47 and provides pivotal support for the motor in the chamber 51 of the carburetor 50. For the purpose of operating the metering rods 52, 53 of the carburetor 50, a hollow, elongated actuator rod 60 preferably of a non-magnetizable or substantially non-magnetizable material, such as stainless steel, has one end secured to the armature 20 and a spider 61 engaging the metering rods 52, 53 (see FIG. 1) is connected to the other end of the actuator rod 60. A resilient member 62 such as a spring circumposing the rod 60 biases the actuator rod 60 with respect to the frame 11.

During operation of the engine, the linear motor 10 continuously modulates the metering rods and controls the air/fuel ratio of the mixture provided by the carburetor. Based on the contents of the exhaust gases discharged from the engine, a small not shown computer having comparator means produces a signal representing the desired air/fuel ratio of the mixture for controlling emissions and improving engine performance. The signal proportional to armature movement alters the position of the metering rods 52, 53 thus altering the air/fuel ratio of the mixture provided by the carburetor to the intake manifold of the engine. Specifically, the signal from the computer dithers (oscillates) the armature 20 of the motor 10 at a moderate frequency, e.g., 10 Hz, and pulse-width-modulates the metering rods.

Figure 4:
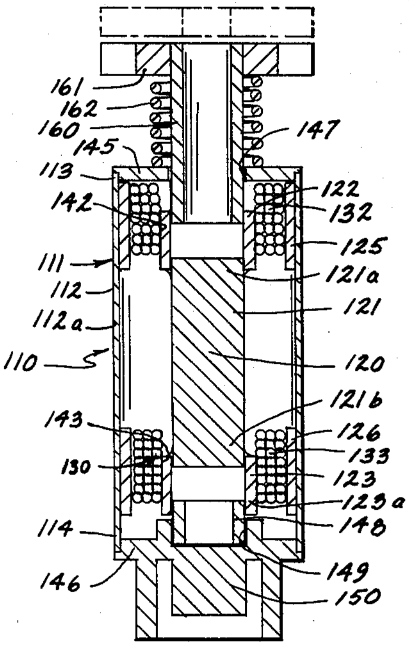
FIG. 4 is a sectional view of an additional embodiment of a linear electric motor.

Referring now to FIG. 4, there is illustrated an additional embodiment of an electric motor 110 of the present invention comprising a frame 111, an armature 120 movably supported in the frame, and a stationary winding 130 circumposing the armature, the widing comprising a pair of coils 132, 133 wound on a pair of individual bobbins 142, 143. The frame 111 comprises a hollow cylinder 112 of magnetizable material having end portions 113, 114.

The armature 120 comprises a permanent magnet 121 having end portions *121a*, *121b*, and a pair of pole pieces 122, 123 of magnetizable material secured to the end portions of the permanent magnet define magnetic poles. A pair of pole shoes 125, 126 of a magnetizable material is secured to the frame 111 adjacent to and in concentric relationship to the pole pieces 122, 123 and defines a pair of stationary poles. It is to be understood, however, that the electric motor 110 can be operated efficiently even if the permanent magnet is not provided with a pair of pole pieces.

The bobbins 142, 143 are axially spaced from each other and are fixedly secured to the frame. Further, each of the coils 132, 133 circumposes the pole pieces 122, 123 of the armature, and the bobbins supporting the coils are disposed adjacent to the end portions 113, 114 of the frame 111 and between one of the stationary poles and the magnetic poles. A pair of end closure members 145, 146 of a substantially non-magnetizable material, such as bronze, is secured to the end portions of the frame 111. A front axial bearing 147 movably supporting the armature 120 is provided in the end member 145. A rear axial and thrust or end bearing 149 also slidably supports the armature 120. Specifically stub shaft 148 is secured to the outer portion *123a* of the pole piece 123 and limits inward movement of the armature. In order to support the motor in the chamber of the carburetor, a support means 150 extends outwardly from the center of the end closure member 146.

Figure 5:
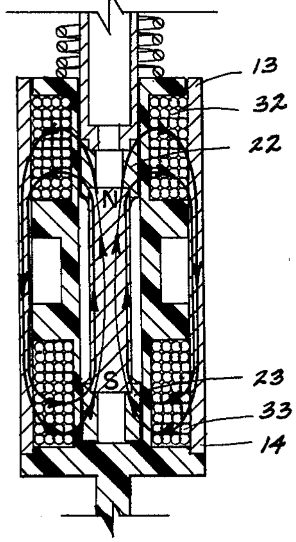
FIG. 5 depicts the magnetic circuit of the linear electric motor shown in FIG. 2.

The motor of the present invention comprises the armature, i.e., the magnet and the pole pieces, the stationary winding and the frame. Referring to FIGS. 3 and 5 and assuming that the pole piece 22 is secured to the north pole of the magnet, flux emanates from the north pole of the magnet through the pole piece radially outwardly through the coil 32 of the stationary winding, then into the end portion 13 of the frame defining one of the stationary poles, through the center portion, into the other end portion 14 of the frame defining the other of the stationary poles and then into and through the coil 33 of the stationary winding and into the other pole piece 23 connected to the south pole of the magnet. In order to energize the motor, a voltage is applied to the stationary winding causing a current to flow through the stationary winding and produce a second magnetic field. The turns of the stationary winding, being disposed in the magnetic field of the magnet, generate a force. Since the stationary winding is secured to the frame and the frame is secured to the chamber of the carburetor, the force moves the armature axially, the direction of armature motion depending upon the direction of the current in the stationary winding. By winding the coils in opposite directions or by reversing current flow in one of the coils of the stationary winding, the inductance of one of the coils cancels the inductance of the other coil thereby reducing impedance to the flow of current and increasing the force exerted on the armature and more rapidly accelerating the armature than if the inductance of the coils had not been cancelled.

While there has been illustrated and described what is at present considered to be a preferred embodiment of the present invention and a single modification thereof, it will be appreciated that numerous changes and modifications are likely to occur to those skilled in the art, and it is intended in the appended claims to cover all those changes and modifications which fall within the true spirit and scope of the present invention.

The embodiments of the invention in which an exclusive property or privilege is claimed are defined as follows:

1. A linear electric motor for adjusting a metering rod of an engine carburetor to control the flow of fuel through the carburetor, wherein the motor comprises a hollow, generally cylindrical frame of magnetizable material, actuator means supported within said frame for rectilinear movement along a longitudinal axis thereof, said actuator comprising an armature including a permanent magnet and a pair of longitudinally spaced magnetic poles each with a magnetizable pole piece secured to a respective one of the poles of said magnet, a rod of non-magnetizable material secured operatively to said permanent magnet and projecting from an end of said frame for effecting movement of a metering rod, a non-magnetizable end member operatively secured to an end of said frame, a pair of stationary poles disposed respectively at opposite ends of the frame substantially surrounding said magnetic poles, electrical windings fixed relatively to the frame and each circumposing a respective magnetic pole, a non-magnetizable bearing means secured to said frame and supporting said armature for delivery of force which is at all times proportional to the amount of electrical energy communicated to said electrical windings, a stop member secured relative to said frame and adapted to arrest motion of the armature in at least one direction, and resilient means for biasing said armature relatively to said frame to an initial position.

2. The motor of claim 1, wherein each of said pole pieces is of cylindrical construction and one of said pole pieces secures said rod to said magnet.

3. The motor of claim 1, wherein said bearing means supports said armature.

4. An electric motor providing an output force which is characterized by a force substantially constantly proportional to the electrical energy energizing said motor and producing a substantially instantaneous response in response to the electrical energy input, comprising a hollow, generally cylindrical frame of magnetizable material and an armature supported within said frame for linear movement along a longitudinal axis thereof, the armature comprising a cylindrical, permanent magnet having a pair of axially spaced magnetic poles and a pair of pole pieces of magnetizable material with uniform diameter along their respective lengths and secured one to each of the respective magnetic poles, a non-magnetizable rod operatively secured to said permanent magnet, a pair of axially spaced cylindrical coils secured in a fixed manner relative to said frame and circumposing said armature, each of said axially spaced cylindrical coils being disposed in complementary relationship with a respective pole piece whereby the magnetic poles and pole pieces develop magnetic fields of substantially uniform density through the coils and throughout the effective traversal of said pole pieces relative to the coils, the coils having a uniform cross section and the combination of pole pieces and coils being interrelated through said uniform density magnetic fields to develop substantially constant output force by reason of the uniform cross section of said coils throughout the effective length of travel of the pole pieces, a stop member operatively secured to said frame for engaging and thereby arresting motion of said armature in one direction, a bearing means of non-magnetizable material secured to said frame in concentric relationship with said coils and pole pieces and supporting said rod, and a resilient means for biasing said armature with respect to the frame to a neutral position.

5. The motor of claim 4 wherein said resilient means comprises a spring circumposing said rod and biasing said armature outwardly of said frame.

6. The motor of claim 4 wherein said pole pieces are cylindrical and each provided with an elongated slot and having a diameter greater than the diameter of the permanent magnet.

7. The motor of claim 4, including stationary poles disposed on said frame and located adjacent said magnetic poles, and wherein said coils are disposed between complementary ones of the stationary poles and the magnetic poles associated therewith, said coils being respectively wound in relation to the energizing currents therein so that the inductances of the coils tend to be self-cancelling.

* * * * *